Patented Feb. 3, 1953

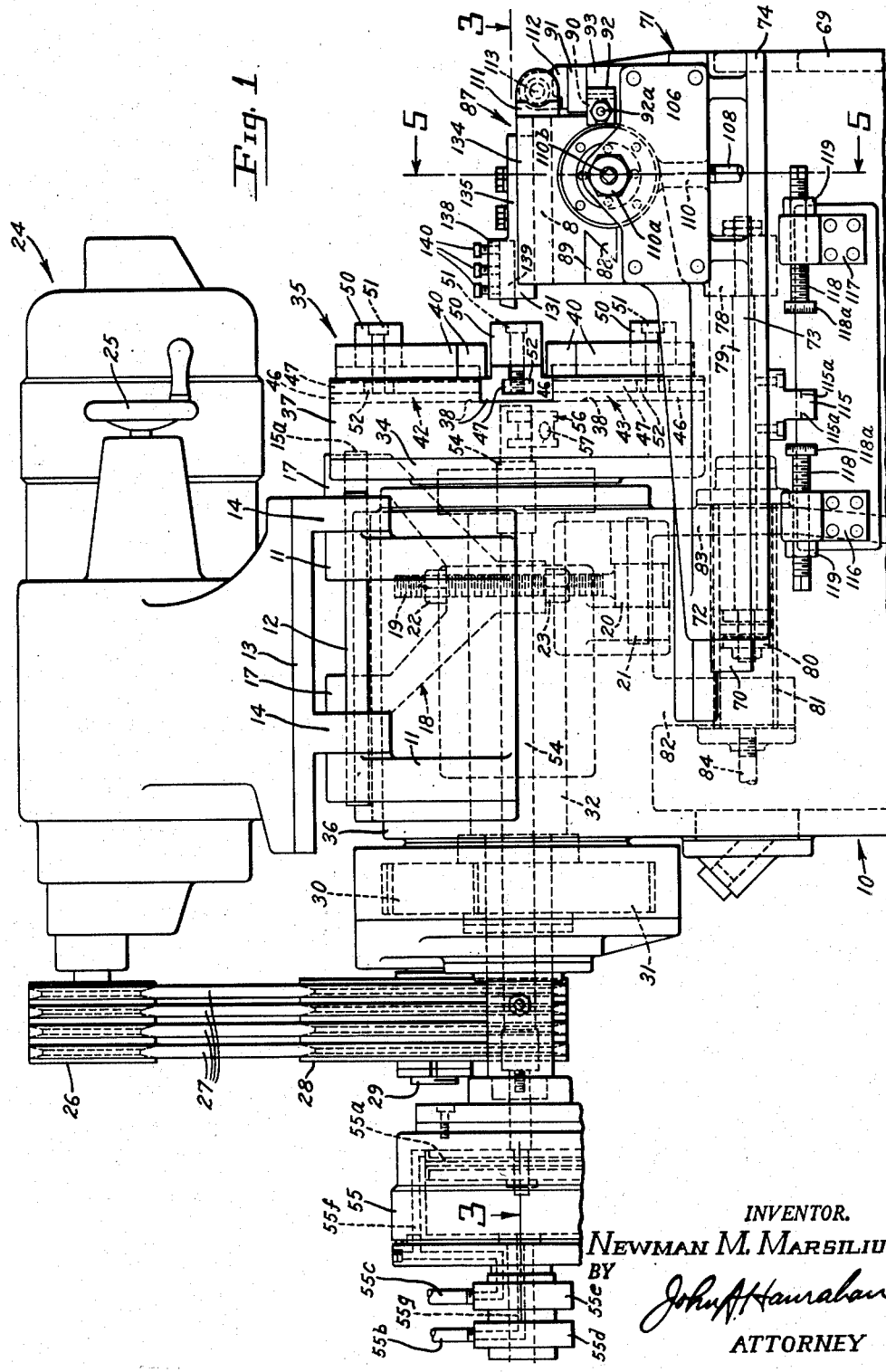

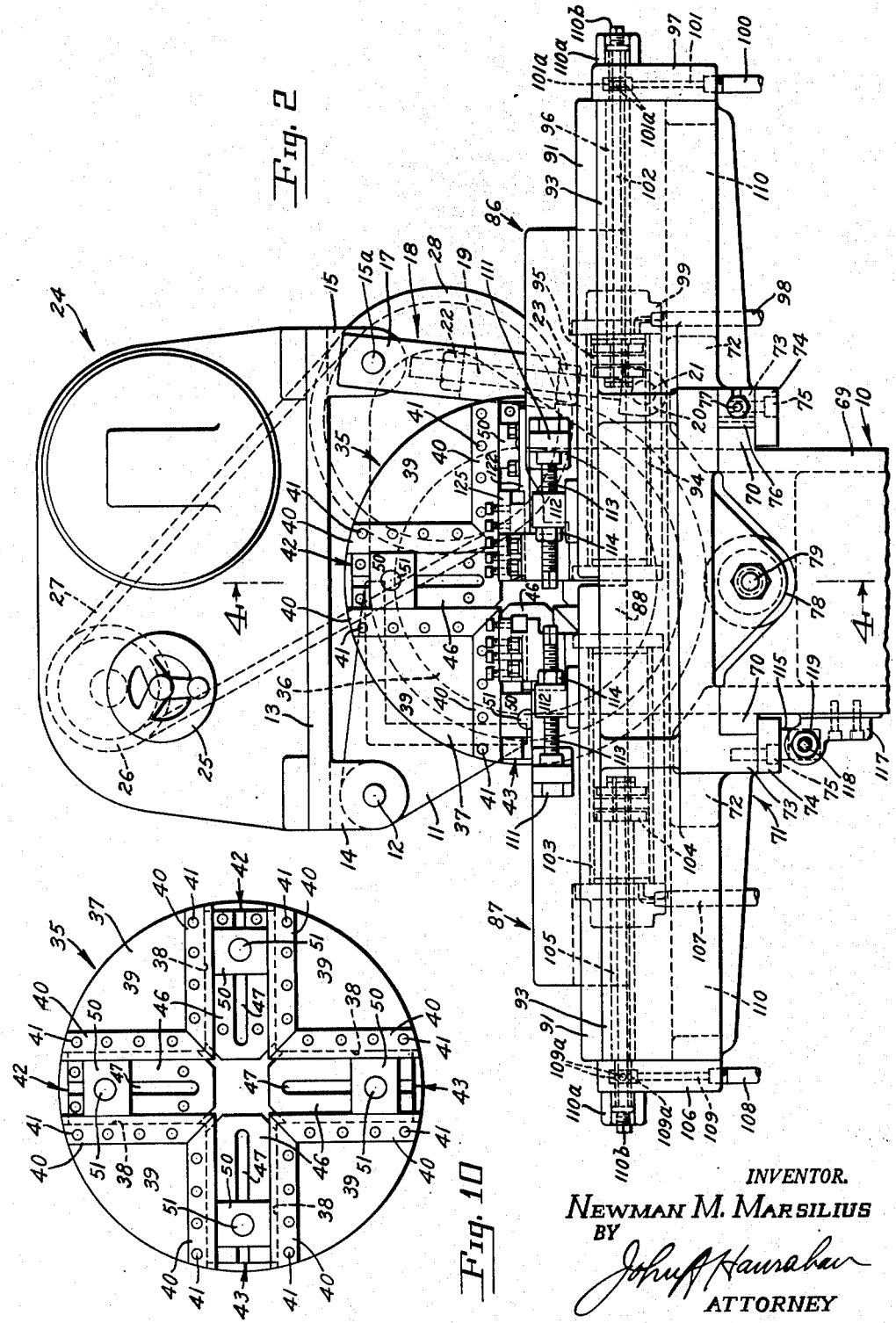

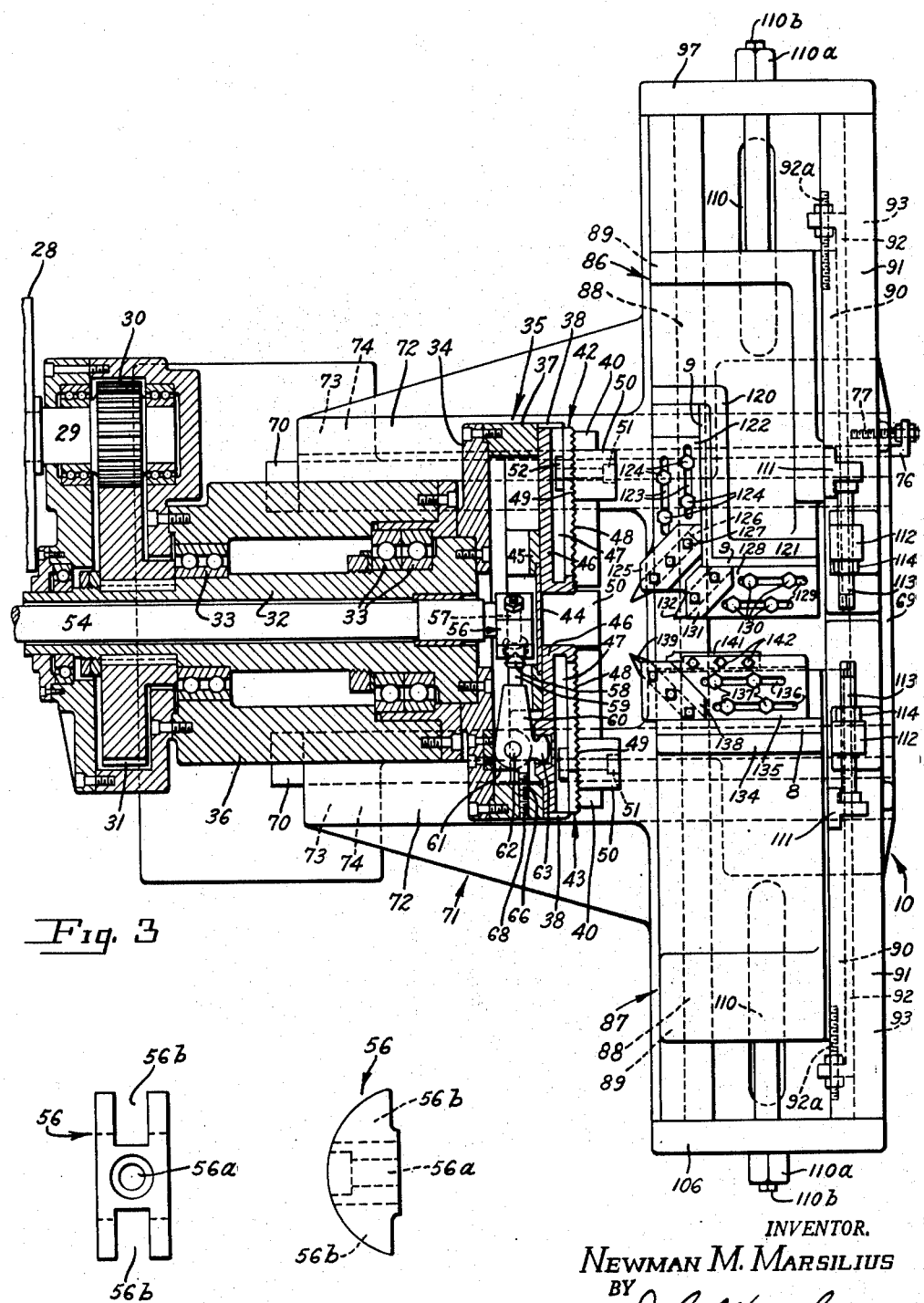

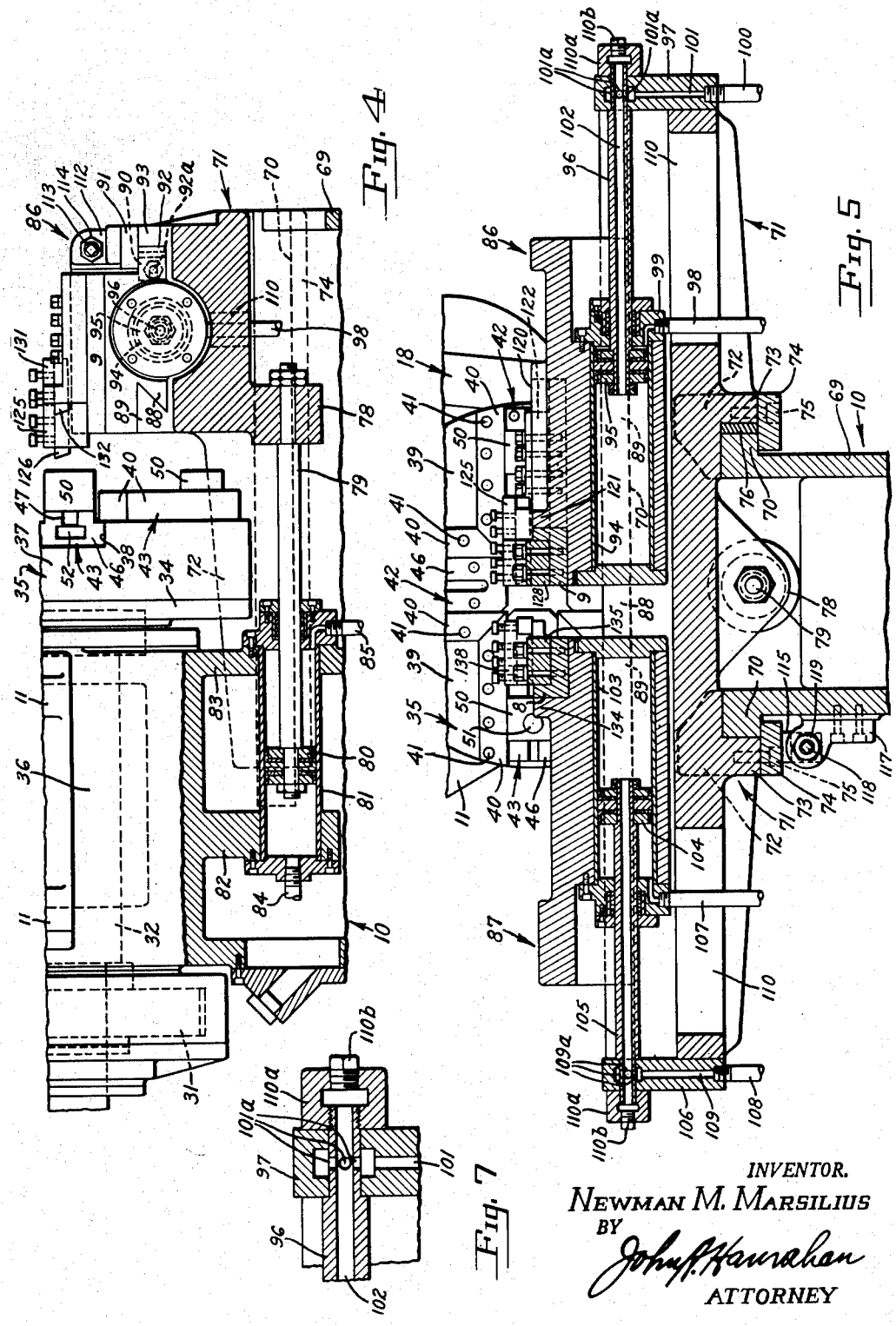

2,627,196

UNITED STATES PATENT OFFICE 2,627,196

TURNING MACHINE

Newman M. Marsilius, Trumbull, Conn., assignor to The Producto Machine Company, Bridgeport, Conn., a corporation of Connecticut Application November 14, 1946, Serial No. 709,681

2 Claims. (Cl. 82—25)

This invention relates to new and useful improvements in machine tools and has particular relation to a machine especially adapted for machining or dressing large or heavy pieces, as for example, a punch holder of a die-set or the like.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view showing the upper portion of a machine constructed in accordance with the invention;

Fig. 2 is a front end view of said upper portion of the machine;

Fig. 3 is a view partly in top plan and partly in horizontal section, the view being taken as along the line 3—3 of Fig. 1;

Fig. 4 is a detailed central sectional view taken as along the plane of the line 4—4 of Fig. 2;

Fig. 5 is a detailed sectional view taken along the plane of the line 5—5 of Fig. 1;

Fig. 7 is an enlarged detail sectional view showing the arrangement for supplying fluid under pressure to a cylinder and for exhausting the fluid from said cylinder;

Figs. 8 and 9 are elevational views, at right angles to one another, of a connector employed; and Fig. 10 is a front elevational view of a chuck or work holder employed in the machine.

Figure 6:
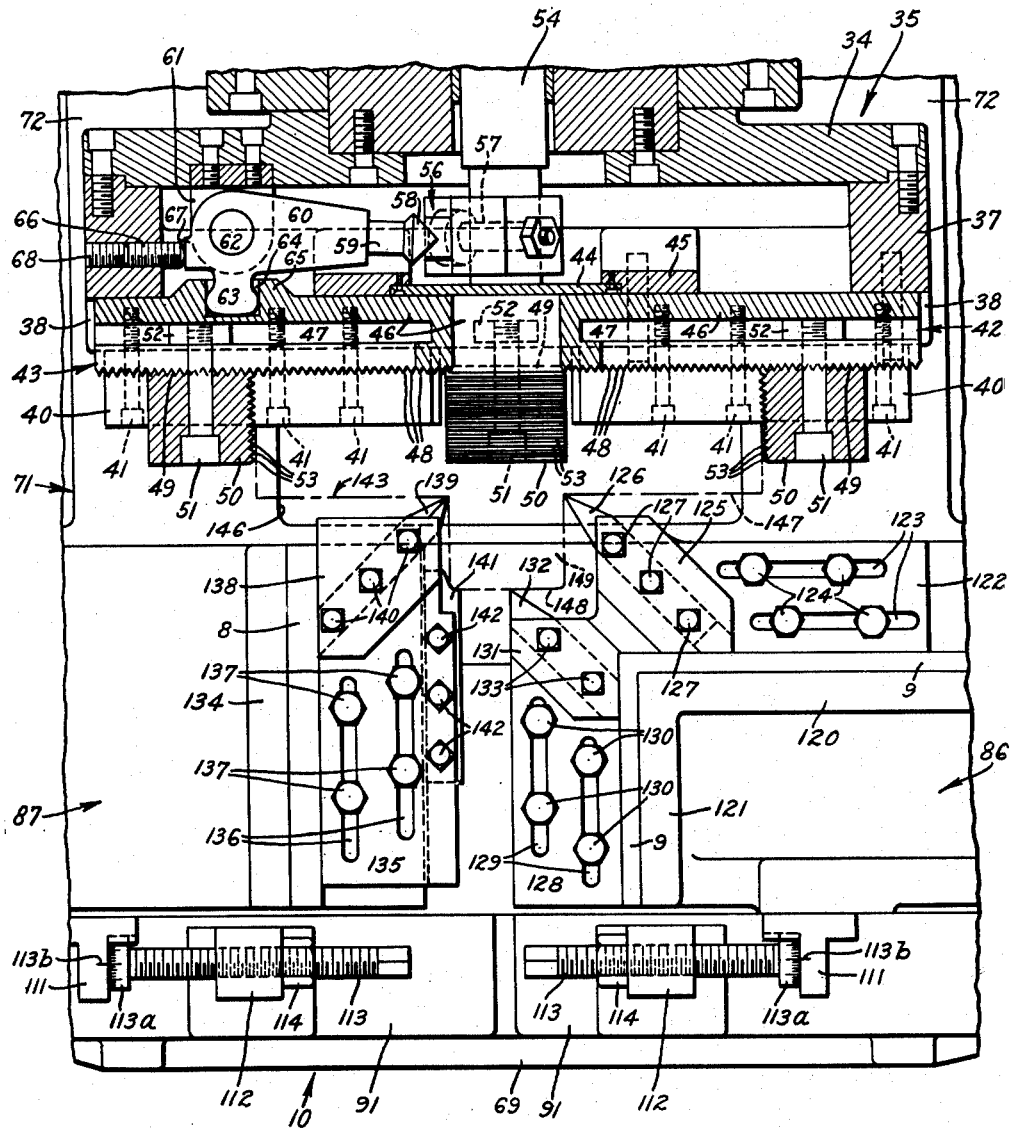
Fig. 6 is an enlarged view partly in section and partly in plan, the section being through the work holder.

Referring in detail to the drawings, the machine of the invention includes any suitable base structure, a portion of which is generally designated 10. As is customary in machine construction, the base 10 comprises a casting.

Extending from one side of an upper portion of the base are a pair of lugs or ears 11 mounting a bar 12 pivotally supporting a motor base 13. This motor base has ear-like portions 14 formed with it and which are pivotally mounted by the bar 12. At its opposite edge the base 13 is provided with depending ears 15 receiving a shaft 15a and such shaft also passes through the upper portions 17 of a Y-shaped member 18. A bolt-like device 19 passes through the yoke portion of the member 18 and at its lower end includes an eye 20 pivotally mounted on a stud 21. Nuts 22 and 23 on the bolt 19, at the upper and lower ends of the yoke portion of member 18, are adapted for adjustment on such bolt to adjust the member 18 upwardly and downwardly moving the platform 13 about the rod 12 for adjustment of a belt drive, as will later appear.

On the upper side of the platform 13 is a motor generally designated 24 and equipped with speed control means (not shown) adjustable on manipulation of the handle 25. Motor 24 drives a multiple pulley 26 over which are trained belts 27 also trained over a multiple pulley 28. The latter pulley is fast to a short shaft 29 which also mounts a relatively small diameter gear 30, in turn meshing with and driving a larger diameter gear 31 keyed or otherwise secured to a tubular shaft 32 extending forwardly in the upper portion of the casting or base 10.

The tubular shaft 32 is mounted for rotation in front and rear bearing means 33. A plate or disc 34 is bolted or otherwise secured to the forward end of the shaft 32 for rotation therewith. Such plate constitutes part of a chuck or other work holder, which latter is generally designated 35 and is located at the forward side of the upper portion 36 of the base or casting.

In addition to the plate 34, the chuck or work holder 35 includes a generally circular structure 37 bolted to the forward face of such plate. Grooves 38 are formed in the forward face of the structure 37 at four equally spaced points and between these grooves the face of the structure is closed by plate-like segments 39. Along the edges of such segments and slightly overhanging the latter and the grooves 38, guide members 40 are mounted and are secured as by means of screws or the like 41.

In the channels formed by the grooves 38 and the members 40, pairs of jaw carriers 42 and 43 are mounted. In the present work holder, four jaws are employed and it is planned that when a run of work is to be handled, two of these jaws are set to position and the other two are moved outwardly and inwardly to work release and work clamping positions to permit of removal of the work from the holder and the placing of work in the holder. The other two of the jaws being stationary and previously located, it will be understood that the work is properly positioned without the loss of time and with a minimum of effort.

The inner ends of the guide channels for the jaw carriers 42 and 43 are closed as by a plate 44 and the entire structure 37 is internally braced by integral portions 45 which also assist in supporting the plate. Each carrier 42 and 43 comprises an elongated body 46 having a T-shaped slot 47 opening through its forward face. On its forward face portions, at each side of said slot, the body is provided with teeth or serrations 48

(shown only in the enlarged views) for cooperation with similar teeth 49 on the inner face of a work clamping jaw 50.

These jaws are clamped to the body 46 by means of bolts 51 passing through the jaws and into the body through the T-shaped slot 47 and in the latter threaded into nuts 52. Clearly, on loosening of the bolts 51, the jaws 50 may be moved outwardly from the body 46 (to separate the teeth 48 and 49) and then adjusted along the body. Thereafter, the bolts are tightened to secure the jaws in their new positions. In order that the jaws may tightly clamp the work they are preferably on their inner work engaging faces roughened or knurled or provided with the teeth 53, as shown in Fig. 6.

When the machine is in use, the jaws 50 of the carriers 42 are fixed in position in accordance with the piece to be worked upon. The same is true of the jaws of the carriers 43. Then while the carriers 43 are in retracted positions, the work is positioned against the jaws 50 of the carriers 42 and thereafter the carriers 43 are moved inwardly to bring their jaws against two other sides of the work whereby the latter is clamped in position. The means for shifting the carriers 43 to and from clamping positions includes a bar 54 passing through the tubular shaft 32 and adapted for slight reciprocating movement.

Such bar is connected with a piston 55a within an air cylinder 55 and at the proper times air under pressure is admitted to this cylinder to shift the bar forwardly and rearwardly and thereby shift the carriers 43 to and from their work clamping positions. Air under pressure is alternately admitted to the respective ends of the cylinder 55 being supplied and exhausted from the cylinder as through pipes 55b and 55c to manifolds 55d and 55e communicating with the cylinder at the respective sides of the piston 55a as through passways 55f and 55g. With this construction, while the cylinder 55 rotates with the bar 54 and the shaft 32, the pipes 55b and 55c are constantly in communication with the passways.

On its forward end, bar 54 mounts a cam device 56 fastened to the bar as by bolt and nut means 57 passing through the bar and an opening 56a in the device or cam. Cam or device 56 has kerfs 56b in a pair of spaced portions. This cam cooperates with the heads 58 of stud-like portions 59 carried by crank devices 60 which latter are mounted within the structure 37 as on brackets 61. The heads 58 are partly received in the kerfs 56b whereby as the device 56 is shifted by the bar 54, the heads, and parts associated therewith, will be shifted.

For the desired purpose, such brackets 61 carry pivots 62. The studs 59 project from the long arms of cranks 60 and the short arms 63 of the latter enter sockets 64 provided in raised or thickened portions 65 on the inner sides of the body 46 of the jaw carriers 43. Adjustable studs, as for example, screws 66, are threaded through the structure 37 to engage flats 67 on the heels of the cranks 60. Such screws may be locked in place by second screws 68.

With the described construction, when the bar 54 is moved forwardly, the cam 56 acting on the heads 58, rocks the cranks 60 toward the rear of the machine whereby the carriers 43 are moved inwardly to carry their jaws 50 into clamping engagement with the work. On reverse movement of the bar, said jaws are carried outwardly to released position. The screws 66 limit the extent of rocking movements of the cranks 60 so that such movements in outward directions are confined to those which are necessary to release the work so that excessive movement of the carriers 43 is avoided.

From the above description, it will be seen that the motor 24 through the pulleys 26 and 28 and the belts 27 and the gearing 30 and 31, drives the chuck or work holder 35. Additionally, it will be clear that proper timing of the supply of air under pressure to the cylinder 55 results in opening and closing of the chuck or work holder to release work therefrom and to clamp work therein.

While the chuck or work holder has been shown and described as having two jaws which are set in predetermined positions and two movable jaws for clamping the work against the stationary jaws and for releasing the work, it will be understood that the machine of the invention is not limited to such a construction of work holder. If desired, all of the jaws may be operated by means similar to that employed for operating the jaws by shifting of the carriers 43. However, where a run of work is to be performed, it is desirable to position two of the jaws so that work is easily located in the machine.

After the work is positioned in the holder or chuck 35, it is operated on by a suitable tool and the mounting and operation of these tools will now be considered. At its upper side and at each of its edges, a forward portion 69 of the base is thickened to provide a pair of relatively long ways 70 on which there is mounted a slide 71 including forwardly directed arm portions 72 located on said ways and providing for contact of the slide and ways over a considerable longitudinal distance and a considerable area in all positions of the slide on the ways.

In addition to its portions engaging the upper surfaces of the ways 70, the slide includes portions 73 against the outer edges of the ways and to the undersides of such portions relatively heavy strips 74 are secured as by screws 75. These strips extend under the overhanging edges of the ways so as to prevent vertical movement of the slide relative to the ways. Between one of the ways and one of the portions 73, a gib 76 is located and is adjustable to compensate for wear on the manipulation of a bolt or screw 77. Clearly, the slide 71 is movable inwardly and outwardly on ways 70 toward and from the chuck or work holder 35.

To the desired end, such slide is provided with a depending lug 78 to which is fixed a piston rod 79 at its inner or rear end carrying a piston 80 located within a cylinder 81 mounted in depending portions 82 and 83 of the main base casting. Fluid under pressure (liquid or air) is admitted to and exhausted from the cylinder 81 as through pipes 84 and 85 for shifting the piston 80 in the cylinder and thus for shifting the slide 71 on the ways 70 so as to move such slide toward and from the chuck or work holder 35. The slide may be moved in various timed relation with the operation of the other parts of the machine, as will later be set forth.

Mounted on the upper side of the slide 71 are a pair of cross slides 86 and 87, respectively. At one lower edge, each of the slides 86 and 87 includes a dovetail portion 88 interfitted with a portion 89 of the slide 71, and at its other edge each cross slide includes a portion 90 located under a heavy strap or plate-like portion 91 carried by the slide 71 whereby vertical movement of the cross slides on the slide 71 is prevented.

A gib 92 may be provided between the portion 90 of each cross slide and an upstanding portion 93 of slide 71. It is this upstanding portion 93 which carries the plate-like straps 91. Adjustment of the gibs 92 is provided for by the screws 92a. With the cross slides mounted as described, it will be clear that they are adapted for movement toward and from one another in directions transverse to the directions in which slide 71 is adapted to be moved.

Means including piston and cylinder constructions are provided for moving the cross slides 86 and 87 and in this connection a cylinder 94 is built into the underside of the slide 86 and within such cylinder is located a piston 95, the piston rod 96 of which is tubular and extending out through one end of the cylinder has its outer end anchored in a member or part 97 formed with or rigidly secured to the slide 71.

A pipe 98, including a flexible connection (not shown) whereby the pipe may move with the slide 86 is fastened to the cylinder head 99 and is adapted to supply fluid under pressure (either air or liquid) to the cylinder 94 at the forward side of the piston 95. Somewhat similarly, a pipe 100 is adapted to supply fluid under pressure to a passage 101 in the member 97, which passage communicates through openings 101a with a passage 102 through the piston rod 96 and thus places the pipe 100 in communication with the interior of cylinder 94 at the rear of piston 95.

With this construction, when fluid under pressure is admitted through the pipe 98, the cylinder 94, and thus the entire slide 86, is caused to move toward the right in Fig. 5, it being understood that the piston 95 is stationary. Thereafter, on fluid under pressure being admitted through the pipe 100 and exhausted through the pipe 98, the cylinder 94 and thus the slide 86 will be moved back to or toward the extreme inner position of Fig. 5.

A similar arrangement is provided by moving the slide 87. Thus, within such slide is a cylinder 103 having therein a piston 104, the tubular rod 105 of which is fixed in a member 106 corresponding with the member 97 above described. In Fig. 5 fluid under pressure is being admitted to the cylinder 103 at the forward side of the piston 104 so that said cylinder and the slide 87 are being moved toward the left in said figure.

On reversal of the flow of fluid under pressure, the same will be supplied through the pipe 108, passage 109, and openings 109a, and thus to the interior of the tubular piston rod 105, and to the cylinder at the inner side of piston 104. Pipe 107 includes a flexible connection (not shown) whereby the pipe may shift back and forth with cylinder 103 and slide 87. Then the cylinder and the slide 87 will be moved inwardly or toward the slide 86.

It will be understood that the pipes 98 and 107 must move with the respective cylinders and cross slides and to accommodate such movement of the pipes, slide 71 is provided with elongated openings or slots 110 toward each of its outer end portions. The rods or tubes 96 and 105 are anchored to the end members 97 and 106 as by hollow nuts 110a closed as by plugs 110b. These plugs may be loosened as required to permit of bleeding of any entrapped air from the hydraulic system.

Adjustable stops are provided for controlling the strokes of the cross slides 86 and 87. To the desired end, a lug 111 (see Fig. 3) is attached to each slide or formed with each such slide. On the upper face of each of the plates 91 is a bracket 112 and threaded through such brackets are micrometer screws 113, adapted to be locked in adjusted positions by nuts 114.

Obviously, these screws are in the inward path of movement of the lugs 111 when they move with the slides 86 and 87 and will thus limit the inward movements of the slides. Actually each screw includes a head 113a (see Fig. 6) having micrometer graduations thereon to be read in connection with a line 113b inscribed or otherwise formed on its cooperating lug 111.

Somewhat similar means (see Fig. 1) are provided by controlling the inward and outward movements of the slide 71. As here shown, such means includes a lug 115 fastened to the slide and brackets 116 and 117 fastened to the outer surface of a side of the base 10. These brackets support adjustable screws 118 located in the path of movement of the lug 115 and adapted to be secured in adjusted positions by nuts 119.

Clearly, as slide 71 is moved inwardly, it will be stopped at a predetermined position by engagement of the lug 115 with the inner screw 118 and movement of the slide outwardly is limited by engagement of said lug with the outer screw 118. These screws each include a head 118a to be engaged by the lug 115 and micrometer graduations on the screw heads are to be read in conjunction with marks 115a on the lug 115.

Slide 86 is provided with an L-shaped raised portion including ribs 120 and 121. An L-shaped wear plate 9 is located on the slide about the ribs 120 and 121. Against the wear plate 9 and parallel with the rib 120, a tool holder 122 is located and this tool holder is provided with longitudinally extending slots 123 through which pass bolts 124 for clamping the holder to the slide. Tool clamping means 125 of the holder 122 is adapted to receive a tool, as for example, a tool 126 (Fig. 6), and the latter is held in the clamp as by screws 127. A second tool holder 128 comprises a plate-like body also on the wear plate 9 and having an edge aligned by the rib 121 and this second holder is provided with longitudinally extending slots 129 through which pass bolts 130 for securing the holder in adjusted position transversely of the slide 86.

A work clamp 131 on the inner end of the holder 128 is shown as mounting a tool 132 held in the clamp as by bolts 133. Clearly, the tools may be adjusted slightly inwardly and outwardly of the clamps 125 and 131 and in addition, the holders 122 and 128 may be adjusted in the direction of the length of their slots 123 and 129, respectively. Thus, the holder 122 may be adjusted in the direction of movement of the slide 86 while the holder 128 may be adjusted in the direction transverse to such direction of movement.

Slide 87 at its inner end has an upstanding rib 134 for locating a wear plate 8 mounting a tool holder 135 having longitudinally extending slots 136 through which pass bolts 137 for securing the holder in position on the slide 87. Obviously, on loosening of the bolts 137, the holder 135 may be adjusted in directions transverse to those in which the slide 87 is movable. A clamp 138 on the inner end of the holder 135 mounts a tool 139 held in position in the clamp by screws 140. Additionally, a bevelling tool 141 is secured in the holder 135 as by screws 142. In Fig. 6, a piece of work 143 is shown by dot and dash lines as held in the chuck 35 and in addition, in this view, the base is shown as provided with a relatively large opening 146 below the work holder for the passage of chips.

In using the machine of the invention, assuming the various tools to be in place and properly adjusted and that the two stationary jaws of the work holder or chuck have been set, a piece of work, as for example, the punch holder 143 of a die-set, is disposed against the stationary jaws of the chuck and fluid under pressure supplied to the cylinder 55 so as to have the rod 54 shifted to bring the movable work holder jaws, that is, the work holder jaws on the carriers 43, into engagement with the work. Now the work is held and the operator starts the motor 24 which through the described belting and gearing serves to rotate the work holder.

At this time, the slides 86 and 87 are in their outer positions, as is the slide 71. Fluid under pressure is supplied to the cylinder 81 to bring the slide 71 and thus the cross slides inwardly or toward the work. However, at this time, the cross slides are themselves in their outer positions. The slide 71 is moved inwardly until its lug 115 engages the inner stop screw 118. Then the cross slides are fed. The cross slides may be used in various combinations depending on the tools.

Thus, in the drawing, slide 86 may be moved inwardly to have the tool 126 make a roughing cut on the face 147 of the work. The relationship between the tool 126 and the tool 132 is preferably such that as the tool 126 reaches a certain point in its inward progress across the face 147, the tool 132 will serve to machine the face 148 of the pin-like part of the work. As the slide 87 is moved inwardly, the tool 139 may make a finishing cut on the face 147 and at about the limit of inward movement of slide 87, the tool 141 may dress or bevel the end of the stem-like portion 149 of the work. Thereafter, the slide 71 may be fed outwardly to have tool 126 make a roughing cut on the sides of the portion 149 of the work and to have the tool 139 make a finishing cut on this same part.

Several timing relationships between the slides may be provided. For example, the slide 86 may be moved entirely inwardly or to carry its tools across the face 147 while the slide 87 remains stationary. Then the slide 87 may be moved inwardly to have its tool function. Thereafter, slide 71 may be moved outwardly to have the tools 126 and 139 dress the periphery of the stud 149. Instead of the above procedure, slide 87 may move inwardly to carry its tool 139 across the work face 147 immediately in the rear of the operation of the tool 126.

When the slides 86 and 87 reach the predetermined limits of movement toward one another, their stop lugs 111 engage the previously set stop screws 113. It will be understood that when the slide 71 is moved the cross slides 86 and 87 must move with it. However, as to movements toward and from one another, the cross slides are independently controllable and each is provided with its own cylinder and piston construction for effecting movements of such slides toward and from one another or in directions across work held by the holder 35.

The machine of the invention is especially adapted for the rapid machining of heavy pieces. The work is quickly positioned and held in the chuck and thereafter the feeds of the slides are all brought about by power operated means. A heavy rigid structure is provided so that a very substantial roughing cut may be made in directions longitudinally of the machine as well as transversely thereof.

The holders 122 and 128 provide for independent adjustment of the tools 126 and 132 relative to one another, and relative to the slide 86. Further, adjustment of the holder 135 inwardly and outwardly of the machine is provided for and this holder is of such construction that tools 139 and 141 may be adjusted to more retracted positions relatively, if that is desired. The same is true of the tools 126 and 132 mounted by the holders 122 and 128, respectively.

Having thus set forth the nature of my invention, what I claim is:

1. In a machine of the character described having a work holder, the improvement comprising a slide, means for moving said slide toward and from the work holder, a pair of slides on the first mentioned slide, means for moving the slides of said pair at right angles to said first mentioned slide toward and from one another, a tool holder on each slide of said pair and adjustable thereon in directions parallel with the directions of movement of the first mentioned slide, a second tool holder on one of the slides of said pair, and said second tool holder adjustable in the directions in which the slides of the pair are movable.

2. In a machine of the character described having a work holder, the improvement comprising a first slide, means for moving said slide toward and from the work holder, a second slide on the first slide, means for moving the second slide in directions at right angles to those in which the first slide is movable, a first tool holder on the second slide, means mounting said tool holder on said second slide for adjustment relative thereto in directions parallel with the directions of movement of the first slide and for anchoring the first tool holder in adjusted position, a second tool holder on the second slide, and means mounting said second tool holder for adjustment relative to said second slide in the directions in which the second slide is movable and for anchoring the second tool holder in adjusted position.

NEWMAN M. MARSILIUS.

REFERENCES CITED

The following references are of record in the file of this patent:

UNITED STATES PATENTS

| Number | Name | Date |
|---|---|---|
| 1,212,257 | Pokora | Jan. 16, 1917 |
| 1,367,459 | Carson | Feb. 1, 1921 |
| 1,382,380 | Parsons | June 21, 1921 |
| 1,564,483 | Kenyon | Dec. 8, 1925 |
| 1,611,191 | Heard | Dec. 26, 1926 |
| 1,920,209 | Norton | Aug. 1, 1933 |
| 2,005,509 | Shaw | June 18, 1935 |
| 2,008,012 | Foster | July 16, 1935 |
| 2,124,164 | Fritzsch | July 19, 1938 |
| 2,232,304 | Baker | Feb. 18, 1941 |
| 2,318,177 | Mathias | May 4, 1943 |
| 2,338,125 | May | Jan. 4, 1944 |
| 2,340,513 | Deuring | Feb. 1, 1944 |
| 2,372,342 | Smith | Mar. 27, 1945 |
| 2,389,746 | Sparks | Nov. 27, 1945 |
| 2,419,639 | Groene | Apr. 29, 1947 |
| 2,426,376 | Smallpiece | Aug. 26, 1947 |
| 2,475,326 | Johnson | July 5, 1949 |
| 2,540,323 | Cross | Feb. 6, 1951 |